US012679544B2

(12) United States Patent
Valdes De La Garza et al.

(10) Patent No.: US 12,679,544 B2
(45) Date of Patent: Jul. 14, 2026

(54) PASSENGER SEATING UTILIZING COMMON PIVOT POINT FOR BACKREST RECLINE AND TABLE DEPLOYMENT

(71) Applicant: B/E Aerospace, Inc., Winston-Salem, NC (US)

(72) Inventors: Javier Valdes De La Garza, Winston-Salem, NC (US); Moises Perez, Miami, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 148 days.

(21) Appl. No.: 18/821,099

(22) Filed: Aug. 30, 2024

(65) Prior Publication Data

US 2026/0062126 A1 Mar. 5, 2026

(51) Int. Cl.
| | |
|---|---|
| B60N 3/00 | (2006.01) |
| B64D 11/00 | (2006.01) |
| B64D 11/06 | (2006.01) |

(52) U.S. Cl.
CPC ............ B64D 11/064 (2014.12); B60N 3/004 (2013.01); B64D 11/0638 (2014.12)

(58) Field of Classification Search
CPC ...... A47C 7/68; B60N 3/004; B64D 11/0638; B64D 11/064
See application file for complete search history.

(56) References Cited

U.S. PATENT DOCUMENTS

| | | | | |
|---|---|---|---|---|
| 4,431,231 | A | 2/1984 | Elazari et al. | |
| 5,133,587 | A * | 7/1992 | Hadden, Jr. | ........ B60N 2/42709 297/146 |
| 5,485,976 | A * | 1/1996 | Creed | ................ B64D 11/0649 244/118.6 X |
| 6,402,244 | B1 * | 6/2002 | Schonenberg | ....... B64D 11/064 297/452.21 |
| 6,454,349 | B1 * | 9/2002 | Konya | ................ B64D 11/0638 297/146 |
| 6,478,256 | B1 * | 11/2002 | Williamson | ....... B60N 2/42709 297/216.14 |

(Continued)

FOREIGN PATENT DOCUMENTS

| | | |
|---|---|---|
| DE | 102005015237 A1 | 10/2006 |
| EP | 1390228 A1 | 2/2004 |

(Continued)

*Primary Examiner* — Rodney B White
(74) *Attorney, Agent, or Firm* — Suiter Swantz IP

(57) ABSTRACT

A passenger seating assembly for an aircraft cabin includes a set of passenger seats, each seat disposed between two adjacent seat spreaders and including a seatpan and backrest connected at a common pivot point at or near the base of the backrest. The seat spreaders are connected by lower cross-members under the seatpans and an upper crossmember extending laterally behind the passenger seats. Each passenger seat includes a deployable meal table for use by the passenger seated immediately behind, the meal tables connected to and deploying relative to the upper crossmember rather than the backrest or seatpan, such that the meal table deploys independently of the configuration of the passenger seat. Similarly, as the meal table attaches to the upper crossmember rather than the passenger seat, the size of the meal table is not restricted by the width of the backrest.

20 Claims, 18 Drawing Sheets

(56)                References Cited

U.S. PATENT DOCUMENTS

| | | | | | |
|---|---|---|---|---|---|
| 6,550,861 | B1 * | 4/2003 | Williamson | ....... | B64D 11/0638 |
| | | | | | 297/163 X |
| 6,644,738 | B2 * | 11/2003 | Williamson | ....... | B64D 11/0638 |
| | | | | | 297/248 X |
| 6,666,149 | B1 | 12/2003 | Lathrop | | |
| 6,669,295 | B2 * | 12/2003 | Williamson | ....... | B60N 2/42745 |
| | | | | | 297/362.13 X |
| 6,742,840 | B2 * | 6/2004 | Bentley | .................. | B60N 2/995 |
| | | | | | 297/316 |
| 6,749,266 | B2 * | 6/2004 | Williamson | ........... | B60N 3/002 |
| | | | | | 297/452.2 |
| 7,354,019 | B2 * | 4/2008 | Bauer | .................... | B64D 11/06 |
| | | | | | 244/118.6 |
| 7,784,862 | B2 * | 8/2010 | Pozzi | .................... | B64D 11/06 |
| | | | | | 297/163 X |
| 8,596,723 | B2 * | 12/2013 | Ahad | ................. | B64D 11/0649 |
| | | | | | 297/163 X |
| 8,702,163 | B2 * | 4/2014 | Westerink | .............. | B60N 3/004 |
| | | | | | 297/146 |
| 8,870,279 | B2 * | 10/2014 | Suhre | ..................... | B60R 11/00 |
| | | | | | 297/163 X |
| 9,067,510 | B2 * | 6/2015 | Westerink | .............. | B60N 3/004 |
| 9,174,737 | B2 | 11/2015 | Beroth et al. | | |
| 9,227,729 | B2 | 1/2016 | Udriste et al. | | |
| 9,284,055 | B2 | 3/2016 | Beroth et al. | | |
| 9,682,643 | B2 * | 6/2017 | Wegenka | ........... | B64D 11/0646 |
| 10,150,566 | B2 * | 12/2018 | Kretzschmar | ......... | B60N 3/004 |
| 10,214,127 | B2 * | 2/2019 | Wegenka | ............... | B64D 11/06 |
| 10,308,362 | B2 * | 6/2019 | Trimble | ............. | B64D 11/0638 |
| 10,426,258 | B2 * | 10/2019 | Parker | .................... | B60N 3/004 |
| 10,689,119 | B2 * | 6/2020 | Pinger | ............... | B64D 11/0642 |
| 10,696,407 | B2 * | 6/2020 | Murray | ................... | B60N 3/004 |
| 10,967,975 | B2 * | 4/2021 | Rife | ....................... | B60N 2/682 |
| 11,014,676 | B2 * | 5/2021 | Bell | ......................... | B60N 2/68 |
| 11,040,775 | B2 * | 6/2021 | Wong | ................... | B64D 11/064 |
| 11,077,948 | B2 | 8/2021 | Suhre | | |
| 11,420,751 | B2 * | 8/2022 | Smith | ............... | B64D 11/0638 |
| 11,767,119 | B2 * | 9/2023 | Salzer | ............... | B64D 11/0639 |
| | | | | | 244/118.6 |
| 11,820,516 | B2 | 11/2023 | Hontz et al. | | |
| 11,964,767 | B2 * | 4/2024 | Mansouri | ......... | B64D 11/00153 |
| 12,187,174 | B2 * | 1/2025 | Mansouri | .............. | B60N 2/682 |
| 12,280,698 | B2 * | 4/2025 | Tranier | ................. | B60N 2/682 |
| 12,291,136 | B2 * | 5/2025 | Escobar | ................. | B60N 2/919 |
| 2010/0102608 | A1 * | 4/2010 | Sakamoto | ........... | B60N 2/1695 |
| | | | | | 297/313 |
| 2012/0139302 | A1 | 6/2012 | Estevenin et al. | | |
| 2015/0091337 | A1 | 4/2015 | Cailleteau et al. | | |

FOREIGN PATENT DOCUMENTS

| | | |
|---|---|---|
| EP | 2391541 A1 | 12/2011 |
| EP | 2483151 A2 | 8/2012 |
| EP | 2828158 A1 | 1/2015 |
| EP | 3105122 A1 | 12/2016 |
| EP | 3947150 A4 | 2/2022 |
| KR | 102616259 B1 | 12/2023 |

* cited by examiner

PASSENGER SEATING UTILIZING COMMON PIVOT POINT FOR BACKREST RECLINE AND TABLE DEPLOYMENT

BACKGROUND

Meal tables (e.g., tray tables) for passengers in economy class cabins (e.g., of commercial aircrafts, but also applicable to trains, buses, and other passenger transit vehicles) are generally implemented as a component of the seat immediately forward of the passenger's own seat (excepting front-row seats). For example, the meal table may deploy from a rear face of a seat's backrest under the control of, and for use by, the passenger immediately behind. However, the passenger occupying the seat immediately forward may (e.g., during level flight at cruising altitudes, when permitted to do so by cabin crew) recline the backrest of the forward seat. For example, the backrest may pivot or tilt relative to the passenger behind (e.g., the top of the backrest may pivot toward the passenger behind, while the bottom of the backrest may pivot away), which may affect the angle of the deployed meal table (ideally coplanar with the cabin floor). In order to maintain the deployed meal table horizontal, independent of the degree of backrest recline, pivot arms via which the meal table deploys must reach the backrest pivot point.

Further, incorporating the meal table as a component of the backrest may require that the proportions of the meal table correspond to the proportions of the backrest, e.g., if the meal table is to pivot or rotate downward from the backrest it must be substantially as wide as the backrest and have a substantially rectangular shape. Accordingly, other rear-oriented components of the passenger seat, e.g., inflight entertainment (IFE) systems, must also account for these constraints on the backrest.

SUMMARY

In a first aspect, a passenger seating assembly for an aircraft cabin is disclosed. In embodiments, the passenger seating assembly includes at least two seat spreaders and at least two legs, the legs mountable to a floor of the aircraft cabin (e.g., via floor tracks). The seat spreaders and legs are connected by lower crossmembers, e.g., tubular members extending laterally across the seating assembly, each seat spreader and each leg fixed to the lower crossmembers. The passenger seating assembly includes passenger seats (e.g., N passenger seats and N+1 seat spreaders, wherein N is an integer two or greater), each passenger seat disposed between two adjacent seat spreaders on its left and right sides. Each passenger seat includes a seatpan and backrest pivotably connected at a common pivot point, the passenger seat transitionable between default (e.g., upright, taxi/take-off/landing (TTOL)) configurations by articulating (e.g., reclining) the seatback and backrest in a longitudinal direction (e.g., forward/backward). The passenger seating assembly includes an upper crossmember similar to the lower crossmember/s but positioned beneath the passenger seats and connecting the seat spreaders, also extending laterally across the passenger seating assembly. Each passenger seat includes a meal table for use by the passenger sitting immediately behind that seat (e.g., in a seat of the passenger seating assembly immediately behind), the meal table releasably coupled to the backrest and pivotably connected to the upper crossmember, such that the meal table can transition between a stowed configuration (e.g., when the meal table is incorporated into the backrest) and a deployed configuration (e.g., substantially horizontal, or coplanar with the cabin floor) independently of the reclining of the passenger seat.

In some embodiments, each seat spreader includes a forward cam follower on at least one side (e.g., each side adjacent to a passenger seat) proximate to a forward lower crossmember, and the seatpan of each passenger seat includes a forward slot set into its left and/or right sides near the front of the seatpan. The forward slots accept the forward cam followers such that as the passenger seat transitions between default and reclined configurations, the forward cam followers translate along the forward slots.

In some embodiments, each passenger seat backrest includes a pair of joint cam followers fixed on the lower left and right sides of the backrest, e.g., at the common pivot point. The seatpan includes paired joint slots on its rear left and right sides, such that as the passenger seat translates between default and reclined configurations, the joint cam followers translate along the joint slots.

In some embodiments, each meal table is connected to the upper crossmember by table extenders, the table extenders pivotably connected to the meal table at one end and to the upper crossmember at the other end.

In some embodiments, each table extender is pivotably coupled at one end to a bracket, the bracket fixed in turn to the upper crossmember.

In some embodiments, the upper crossmember comprises a set of disconnected segments, such that for each passenger seat the left-side and right-side table extenders are connected to different crossmember segments.

In some embodiments, a left-side and right-side table extender from two adjacent passenger seats may be pivotably coupled to a shared crossmember segment.

In some embodiments, each table extender includes a slot extending partially or fully between the two ends, the slot accepting a tab attached to the meal table such that the meal table slides longitudinally (e.g., forward/backward) via the slots on either side.

In a further aspect, a passenger seat for an aircraft cabin is disclosed. In embodiments, the passenger seat includes two seat spreaders and two legs mountable to a floor of the aircraft cabin (e.g., via floor tracks). The seat spreaders and legs are connected by lower crossmembers, e.g., tubular members extending laterally across the seating assembly, each seat spreader and each leg fixed to the lower crossmembers. The passenger seat includes a seatpan and backrest disposed between two adjacent seat spreaders on its left and right sides, the seatpan and backrest pivotably connected at a common pivot point and the passenger seat transitionable between default (e.g., upright, taxi/takeoff/landing (TTOL)) configurations by articulating (e.g., reclining) the seatback and backrest in a longitudinal direction (e.g., forward/backward). The passenger seat includes an upper crossmember similar to the lower crossmember/s but positioned beneath the passenger seats and connecting the seat spreaders, also extending laterally across the passenger seat. Each passenger seat includes a meal table for use by the passenger sitting immediately behind, the meal table releasably coupled to the backrest and pivotably connected to the upper crossmember, such that the meal table can transition between a stowed configuration (e.g., when the meal table is incorporated into the backrest) and a deployed configuration (e.g., substantially horizontal, or coplanar with the cabin floor) independently of the reclining of the passenger seat.

In some embodiments, each seat spreader includes a forward cam follower on at least one side (e.g., each side adjacent to a passenger seat) proximate to a forward lower crossmember, and the seatpan includes a forward slot set into its left and/or right sides near the front of the seatpan. The forward slots accept the forward cam followers such that as the passenger seat transitions between default and reclined configurations, the forward cam followers translate along the forward slots.

In some embodiments, the backrest includes joint cam followers fixed on the lower left and/or right sides of the backrest, e.g., at the common pivot point. The seatpan includes paired joint slots on its rear left and/or right sides, such that as the passenger seat translates between default and reclined configurations, the joint cam followers translate along the joint slots.

In some embodiments, the meal table is connected to the upper crossmember by table extenders, the table extenders pivotably connected to the meal table at one end and to the upper crossmember at the other end.

In some embodiments, each table extender is pivotably coupled at one end to a bracket, the bracket fixed in turn to the upper crossmember.

In some embodiments, the left-side and right-side table extenders are connected to different, disconnected crossmember segments.

In some embodiments, each table extender includes a slot extending partially or fully between the two ends, the slot accepting a tab attached to the meal table such that the meal table slides longitudinally (e.g., forward/backward) via the slots on either side.

In a further aspect, a passenger seating assembly for an aircraft cabin is disclosed. In embodiments, the passenger seating assembly includes a set of seat spreaders spaced apart and two or more legs mountable to a floor of the aircraft cabin, a lower tubular crossmember connecting the seat spreaders and legs. The passenger seating assembly includes a set of passenger seats, each seat positioned between two adjacent seat spreaders (e.g., N seats, N+1 seat spreaders) and including a seatpan and a backrest connected at a common pivot point, relative to which both the seatpan and backrest may pivot. Each seat is transitionable between a default configuration (e.g., upright configuration suitable for taxi, takeoff and landing (TTOL) operations) and a reclined configuration (e.g., for use at safe cruising altitude) by articulating the seatpan and backrest forward or backward (e.g., in a longitudinal direction; pivoting of the seatpan and backrest may also be associated with upward/downward movement). The passenger seating assembly includes one or more tubular upper crossmembers extending laterally between the passenger seats. Each passenger seat is associated with a spinal support member, centrally oriented with respect to the seat and extending beneath the seatpan and behind the backrest without contacting the seat. Each passenger seat includes a meal table for use by the passenger seated immediately behind, the meal table releasable from the backrest at its top (e.g., via a latch) and pivotably attached to the spinal support associated with the passenger seat. The meal table transitions between stowed (e.g., incorporated into the backrest) and deployed (e.g., coplanar with the cabin floor, substantially horizontal) configurations independently of the reclining of the passenger seat, such that reclining the seat does not affect the orientation of the meal table.

In some embodiments, each seat spreader includes a forward cam follower fixed to a left and/or right side near the lower crossmember. Each seatpan includes a forward slot set into a left and/or right side of the seatpan (e.g., near its forward end) and accommodating a corresponding forward cam follower such that the forward cam follower translates between a forward and rear terminus of the forward slot as the passenger seat transitions between the default and reclined configurations.

In some embodiments, each meal table is pivotably connected to its associated spinal support by a pivot pin set into the upper end of the spinal support (e.g., behind the backrest), translating between the stowed and deployed configurations by rotating or pivoting relative to the pivot pin.

In some embodiments, the meal table is connected to the pivot pin via a pair of table extenders, each table extender connected to the pivot pin on opposite sides of the spinal support and defining a width between them, such that the width between the table extenders may be less than the width of the meal table.

In some embodiments, each seat spreader truncates immediately behind the lower crossmember and/or forward cam follower.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
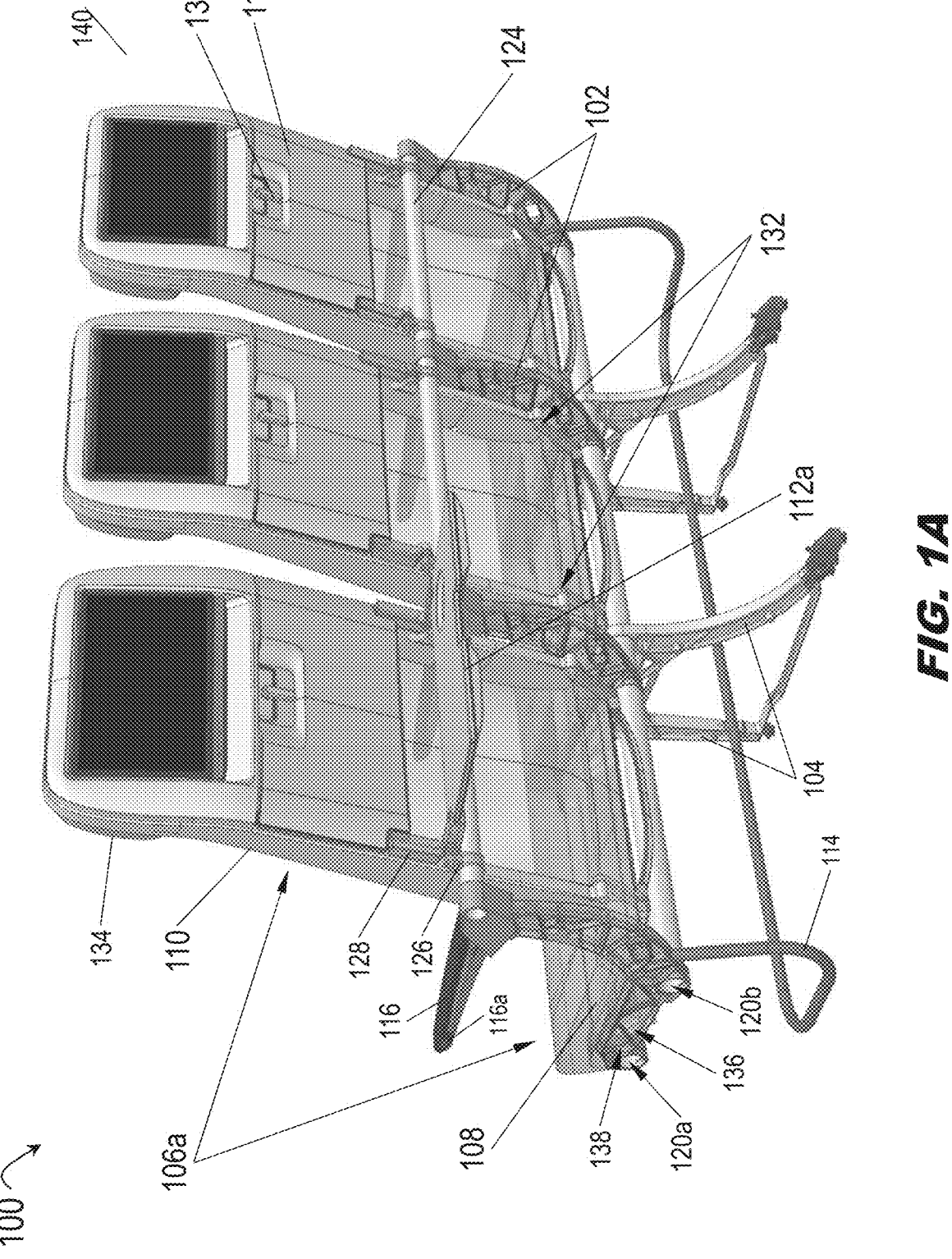
FIG. 1A is a rear isometric view of a passenger seating assembly wherein the passenger seats are in a taxi, takeoff, and landing (TTOL) configuration according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to passenger seating assemblies for vehicular cabins (e.g., aircraft, trains, buses) incorporating a common pivot point (e.g. rotational point) for the meal table for each passenger seat, via which the backrest tilts and the meal table pivotably deploys.

Figure 1B:
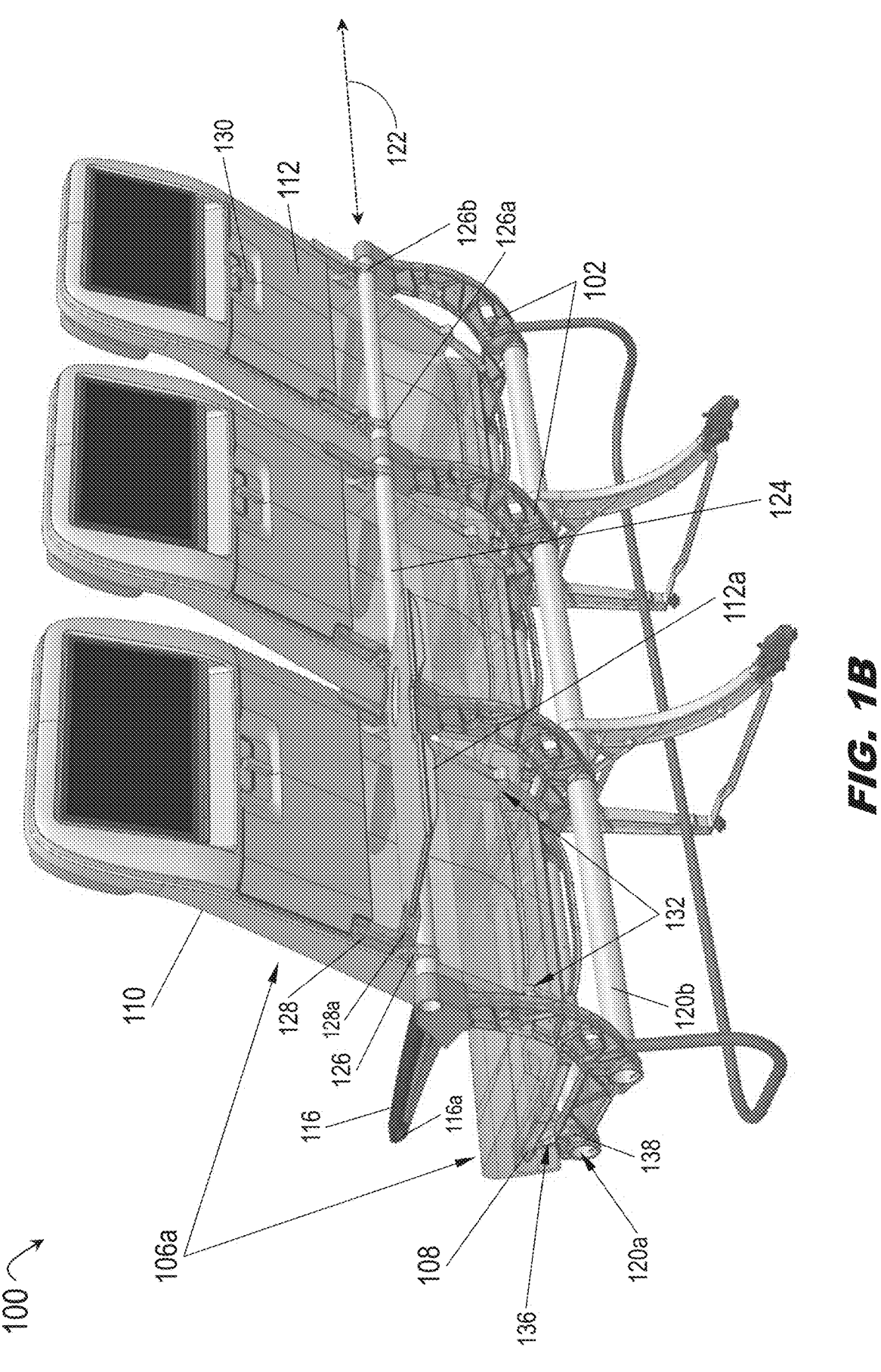
FIG. 1B is a rear isometric view of the passenger seating assembly of FIG. 1A, wherein the passenger seats are in a reclined configuration.
Figure 1C:
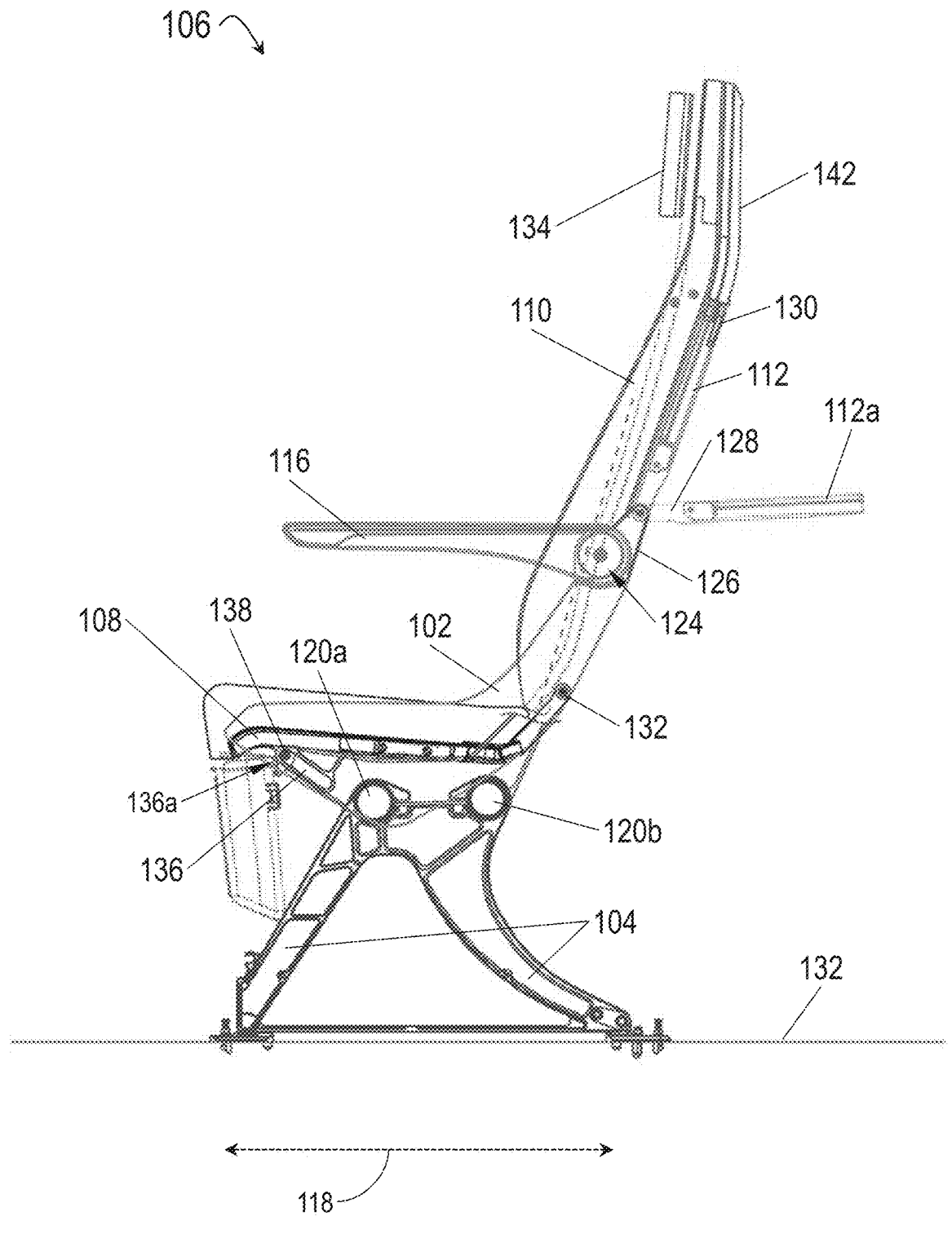
FIG. 1C is a left profile view of a passenger seat of the passenger seating assembly of FIG. 1A in the TTOL configuration.

Referring generally to FIGS. 1A through 1D, a passenger seating assembly 100 is shown. The passenger seating assembly 100 may include seat spreaders 102, legs 104, passenger seats 106 (each passenger seat including a seatpan 108 and backrest 110), meal tables 112, baggage rail 114, and armrests 116. The passenger seats may transition between a taxi, takeoff, and landing (TTOL) configuration 106 (e.g., fully upright), as shown by FIGS. 1A and 1C, and a reclined configuration 106a, as shown by FIGS. 1B and 1C.

In embodiments, the passenger seating assembly 100 may be a set (e.g., row, row portion) of individual passenger seats 106, where each passenger seat includes a seatpan 108 pivotably coupled to a backrest 110, the seatpan and backrest collectively supporting a passenger occupying the passenger seat. For example, each passenger seating assembly 100 may be a grouping of N seat spreaders and (N–1) passenger seats 106, where N is an integer generally between three and six (or four, as shown by FIGS. 1A through 1C) such that each passenger seat is disposed between two adjacent seat spreaders. In some embodiments, the passenger seating assembly 100 includes a single passenger seat 106 disposed between two seat spreaders 102.

In embodiments, the passenger seating assembly 100 includes two legs 104 mountable to the cabin floor of the vehicle. For example, in the case of aircraft cabins, the legs 104 may mount to tracks extending in a longitudinal direction 118 along the cabin floor (e.g., the longitudinal direction parallel to the longitudinal axis of the aircraft or vehicle, and generally to the direction of travel of the vehicle).

In embodiments, the seat spreaders 102 and legs 104 may be connected to each other via one or more lower crossmembers 120 extending in a lateral direction 122, the lateral direction orthogonal (e.g., perpendicular) to the longitudinal direction 118. For example, the lower crossmembers 120 may include a forward lower crossmember 120a and a rear lower crossmember 120b, each crossmember being, e.g., a tubular member extending through, and secured to, apertures in the seat spreaders 102 and the legs 104. In embodiments, the seat spreaders 102, legs 104, and lower crossmembers 120 may remain fixed relative to the passenger cabin while the backrests 110 and seatpans 108 of each individual passenger seat 106 may pivot, translate, or otherwise move (e.g., under the direction of an occupying passenger) relative to the seat spreaders 102 and legs 104.

In embodiments, the passenger seating assembly 100 may include at least one upper crossmember 124 extending along the lateral direction 122. For example, the upper crossmember 124 may extend laterally behind the backrests 110, fixed to the seat spreaders 102 at or near their uppermost portion, and at a height suitable for mounting the armrests 116 (e.g., fixedly or pivotably, such that each armrest may be rotated upward to a position substantially flush with the backrests.

In embodiments, each meal table 112 may be attached to the upper crossmember 124 via brackets 126 and table extenders 128. For example, each meal table 112 may be attached to a table extender 128 on its left and right sides, each table extender attached to a bracket 126 and each bracket clamped or otherwise fixed to the upper crossmember 124. In some embodiments, the table extenders 128 may include slots 128a set thereinto (e.g., into the interior faces of the table extenders). For example, a portion of the table extender 128 may translate along the slot 128a on the left and right sides of the meal table 112, enabling the meal table 112 to slide in the longitudinal direction 118 (e.g., forward and backward, relative to the passenger).

In embodiments, the meal tables 112 may be anchored to the backrest 110 by a latch 130 as is well known in the art. For example, the latch 130 may extend downward in a substantially vertical direction to maintain the meal table 112 in a stowed configuration wherein the meal table is fully or partially incorporated into the backrest 110. When the passenger occupying the passenger seat 106 immediately behind turns the latch 130 to the left or right such that the latch is in a horizontal orientation, the meal table 112 may be released into a deployed configuration 112a, e.g., wherein the meal table is substantially coplanar with the cabin floor (132, FIG. 1C).

Figure 1D:
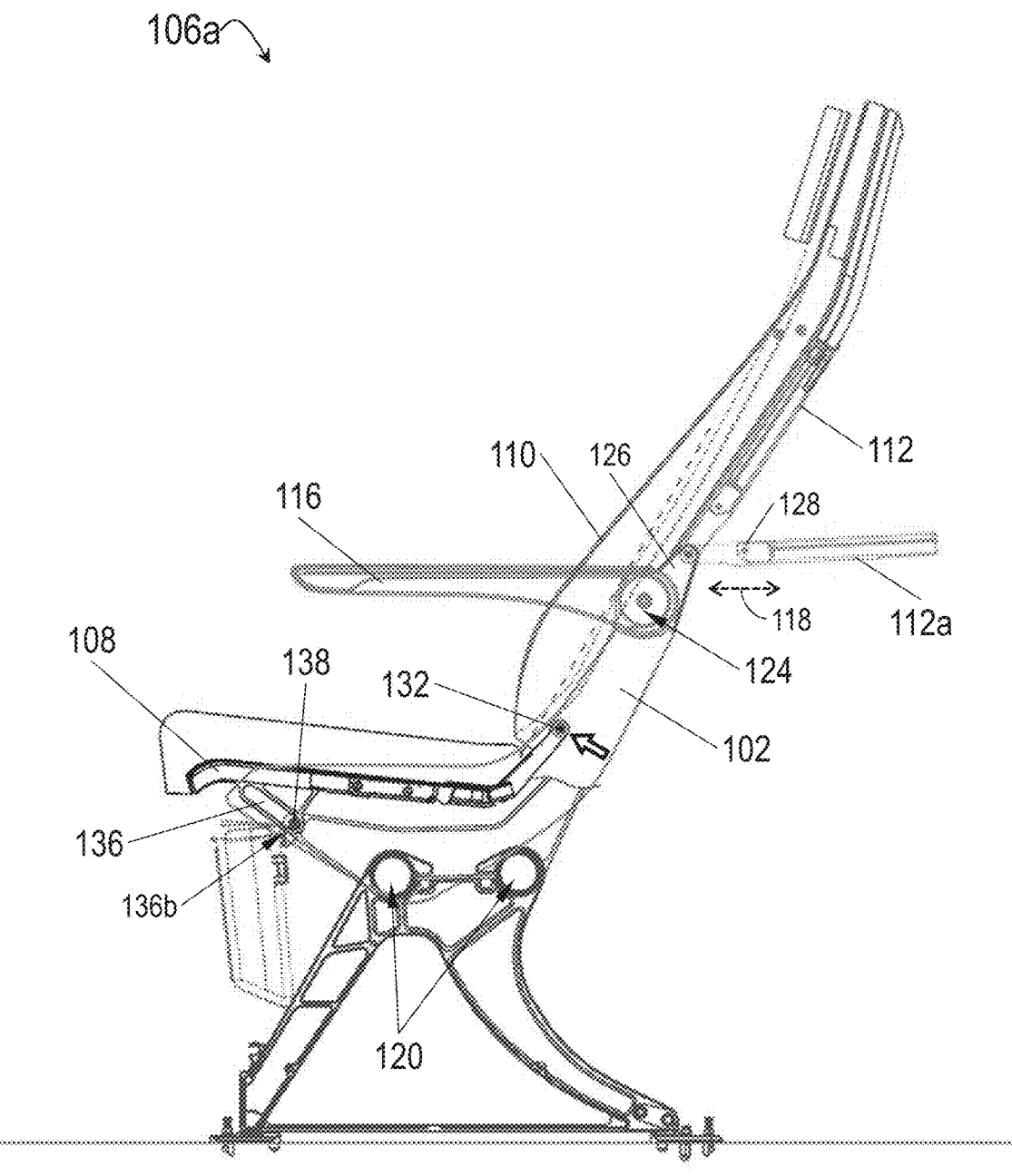
FIG. 1D is a left profile view of the passenger seat of FIG. 1C in the reclined configuration.
Figure 1E:
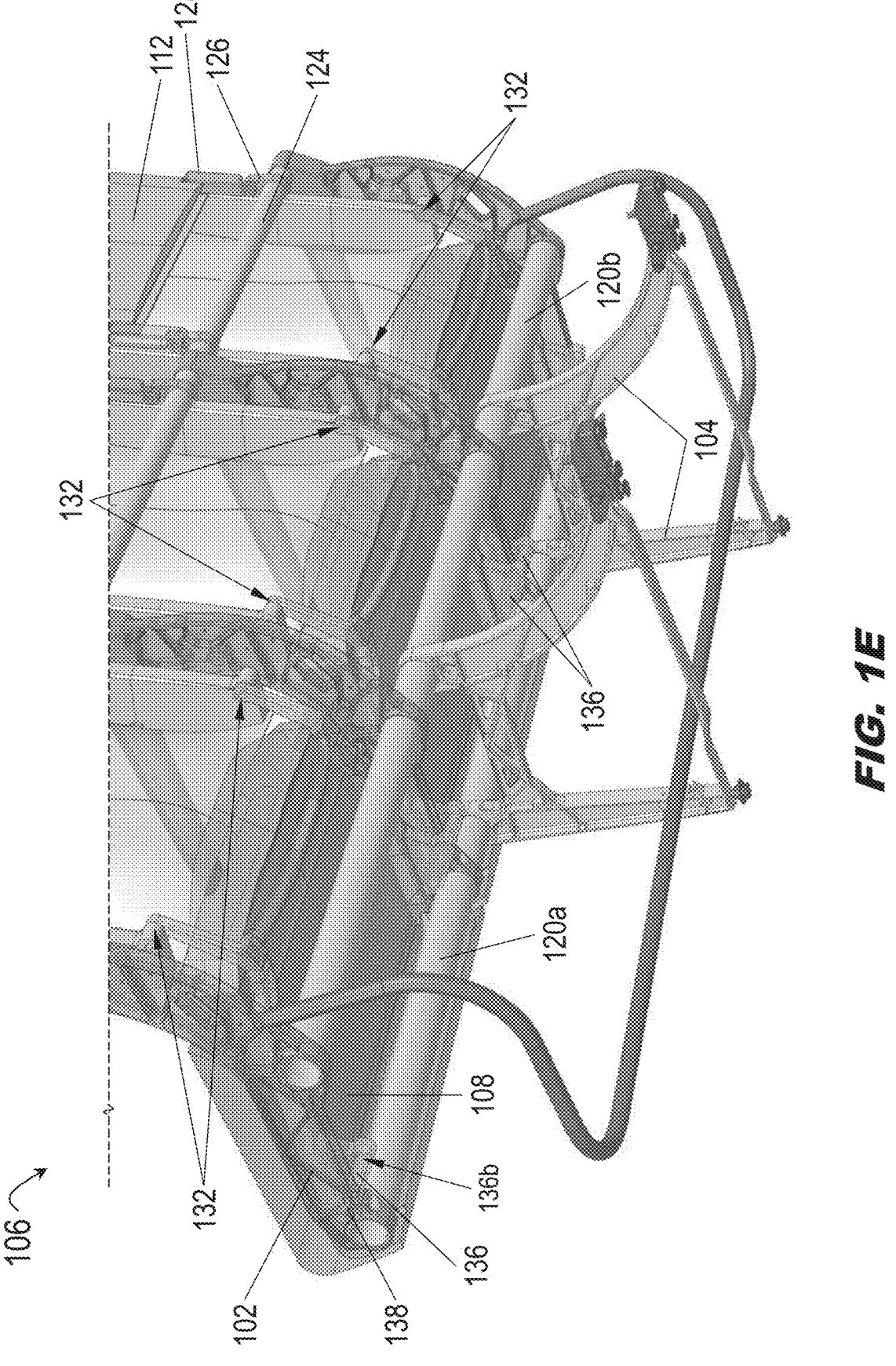
FIG. 1E is an underside view of the passenger seating assembly of FIG. 1A, wherein the passenger seats are in the TTOL configuration.
Figure 1F:
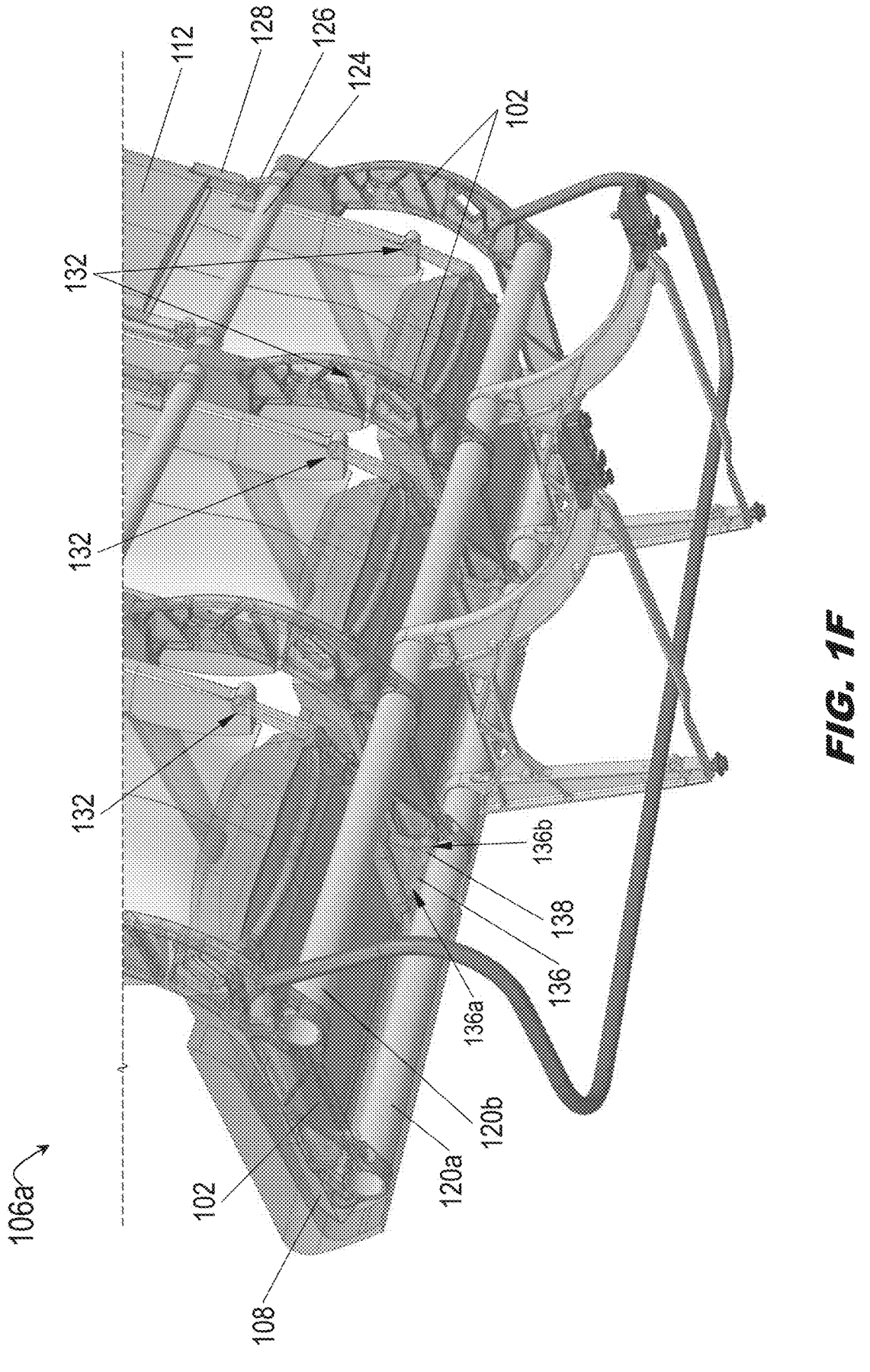
FIG. 1F is an underside view of the passenger seating assembly of FIG. 1E, wherein the passenger seats are in the reclined configuration.

In embodiments, as the meal tables 112 are anchored to the fixed upper crossmember 124 rather than to the backrests 110 or seatpans 108, when the passenger occupying a passenger seat 106 of the passenger seat assembly 100 reclines their seat (e.g., by engaging a button 116a on the armrest 116; compare the taxi, takeoff and landing (TTOL) configuration 106 shown by FIG. 1A, wherein the backrests and seatpans are in fully upright positions, with the reclined configuration 106a shown by FIGS. 1B and 1D, wherein the backrests and seatpans are in reclined positions), the horizontal orientation of the meal table in its deployed configuration 112a may be unaffected. For example, referring in particular to FIGS. 1B and 1D, when the passenger seat 106 is in the reclined configuration 106a, the backrests 110 and seatpans 108 may pivot relative to a common pivot point 132. For example, the backrest 110 may tilt so that its uppermost portion (e.g., including headrest 134) tilts backward while its lowermost portion (e.g., proximate to the common pivot point 132) tilts forward and upward.

In embodiments, the seatpan 108 may similarly tilt forward and upward. For example, each seatpan 108 may include a forward slot 136 set into its left or right side (e.g., the forward slot may be set into both the left and right sides, or into only one side (e.g., for window or aisle seats at an end of the passenger seating assembly 100). Similarly, the adjacent seat spreaders 102 may each include a fixed forward cam follower 138 configured to translate along the forward slot 136 as the passenger seat transitions between the TTOL configuration 106 and the reclined configuration 106a. For example, the forward slot 136 may translate forward and upward with the seatpan 108, such that the forward cam follower 138 is at a forward terminus 136a of the forward slot 136 when the passenger seat is in the TTOL configuration 106 and at a rear terminus 136b of the forward slot when the passenger seat is in the reclined configuration 106a. Note, however, that the forward cam followers 138 are fixed to the adjacent seat spreaders 102 on either end, and thus the forward slot 136, not the forward cam followers, translates during the transition. Note too that the meal tables in the deployed configuration 112a may maintain their substantially horizontal orientation regardless of the position or orientation of the backrest 110 and seatpan 108.

In embodiments, the baggage rail 114 may be fixed to the forward lower crossmember 120a and extend laterally across the lower front of the passenger seating assembly 100, allowing passengers occupying the seats immediately behind to store items underneath the passenger seats 106 and between the legs 104.

In embodiments, each passenger seat of the passenger seating assembly 100 may include an in-flight entertainment (IFE) device 140; e.g., a display screen integrated into the backrest 110 directly above the meal table 112. Similarly to the meal table 112, the IFE device 140 may be configured for use by the passenger seated immediately behind the passenger seat to which the IFE device is mounted.

Figure 2A:
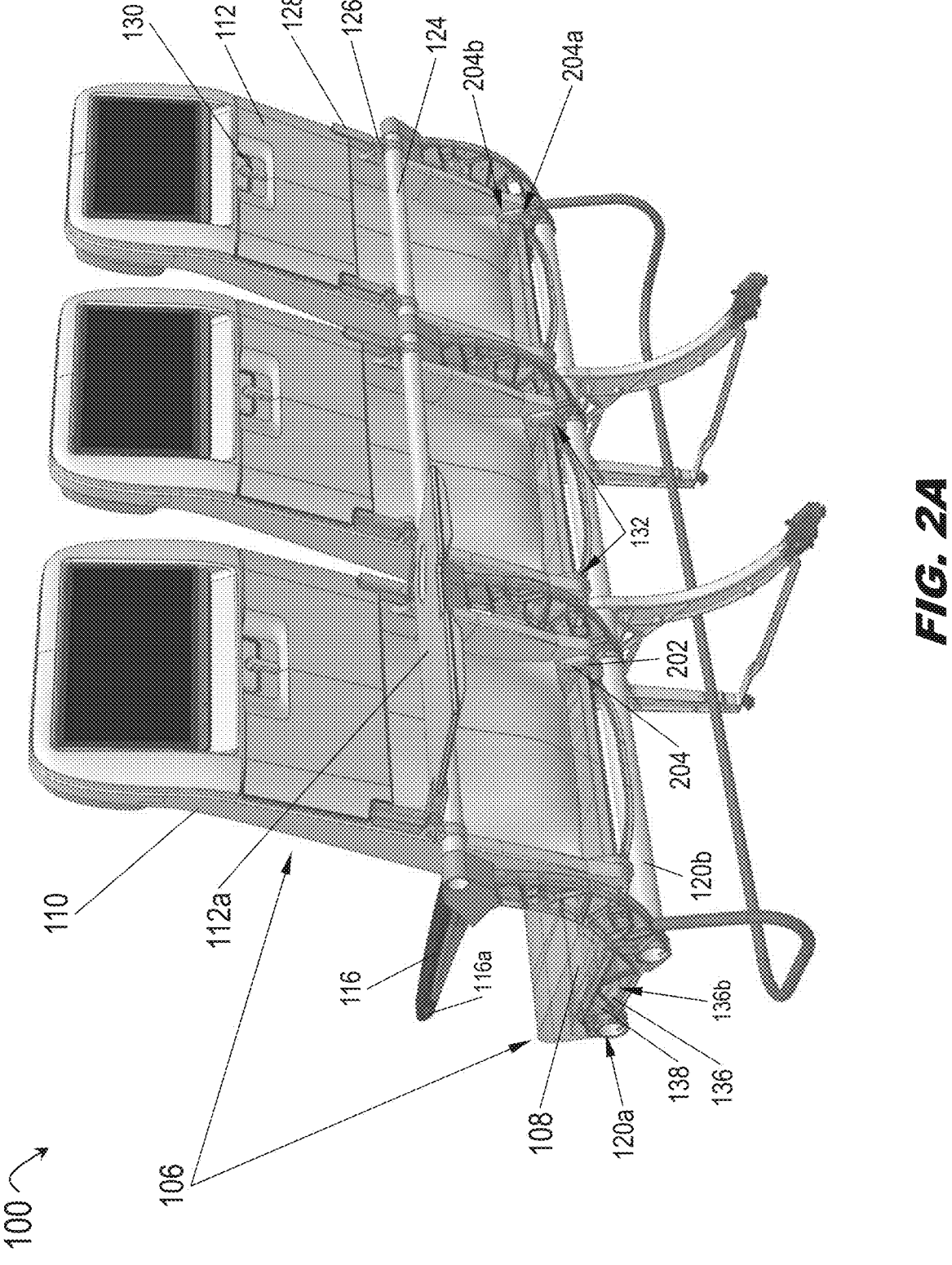
FIG. 2A is a rear isometric view of a passenger seating assembly according to example embodiments of this disclosure, wherein the passenger seats are in the TTOL configuration.
Figure 2B:
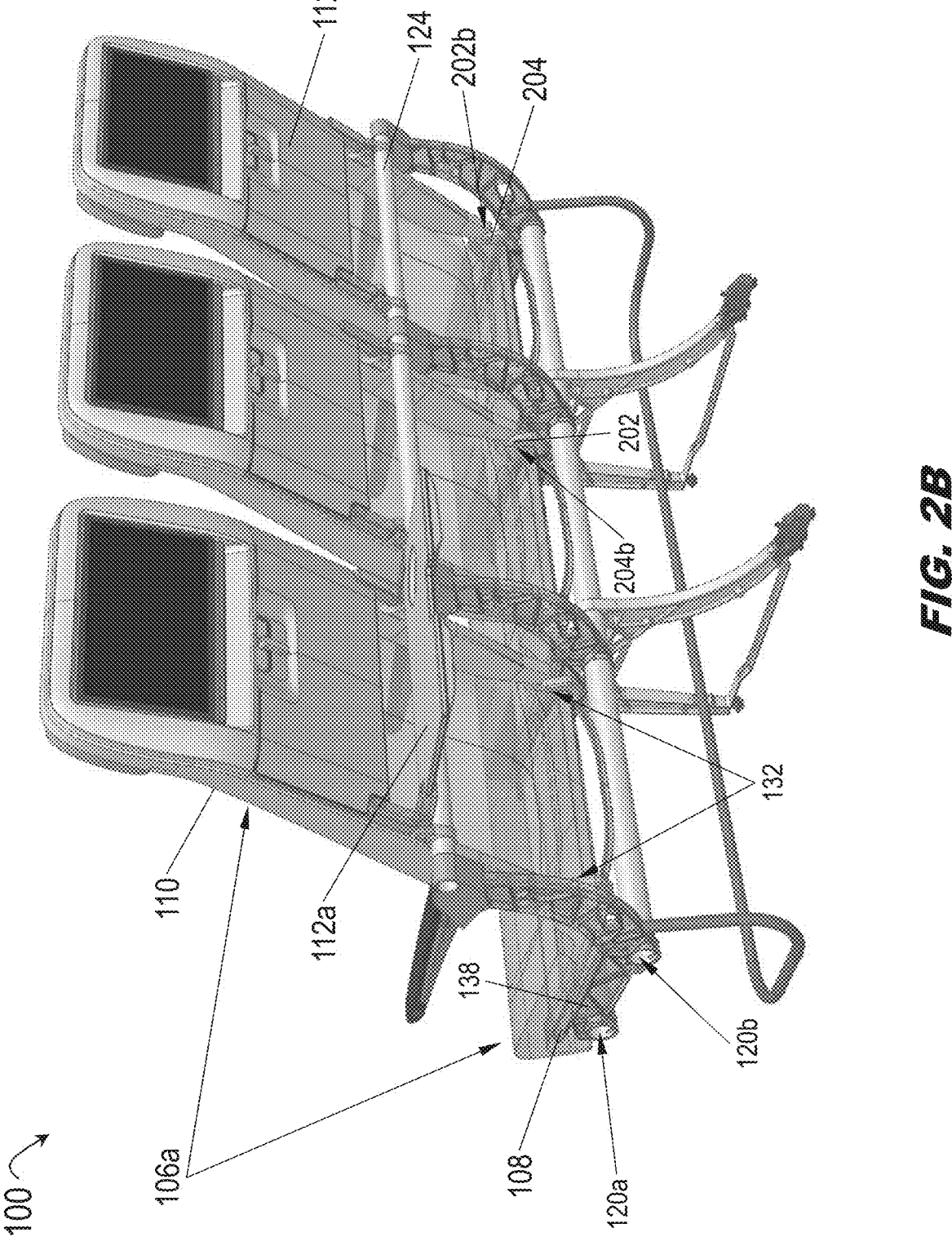
FIG. 2B is a rear isometric view of the passenger seating assembly of FIG. 2A, wherein the passenger seats are in the reclined configuration.
Figure 2C:
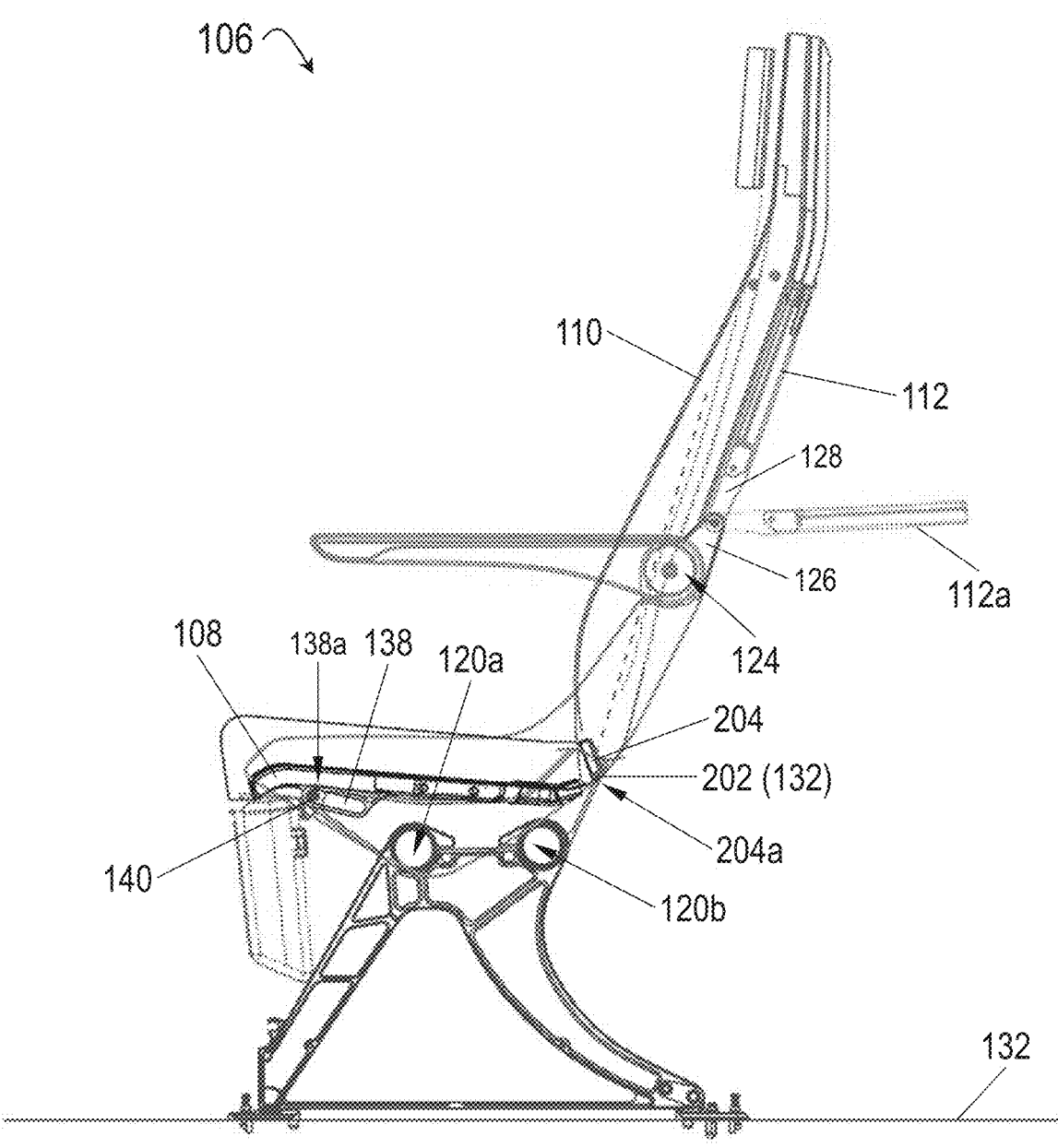
FIG. 2C is a left profile view of a passenger seat of the passenger seating assembly of FIG. 2A, wherein the passenger seats are in the TTOL configuration.
Figure 2D:
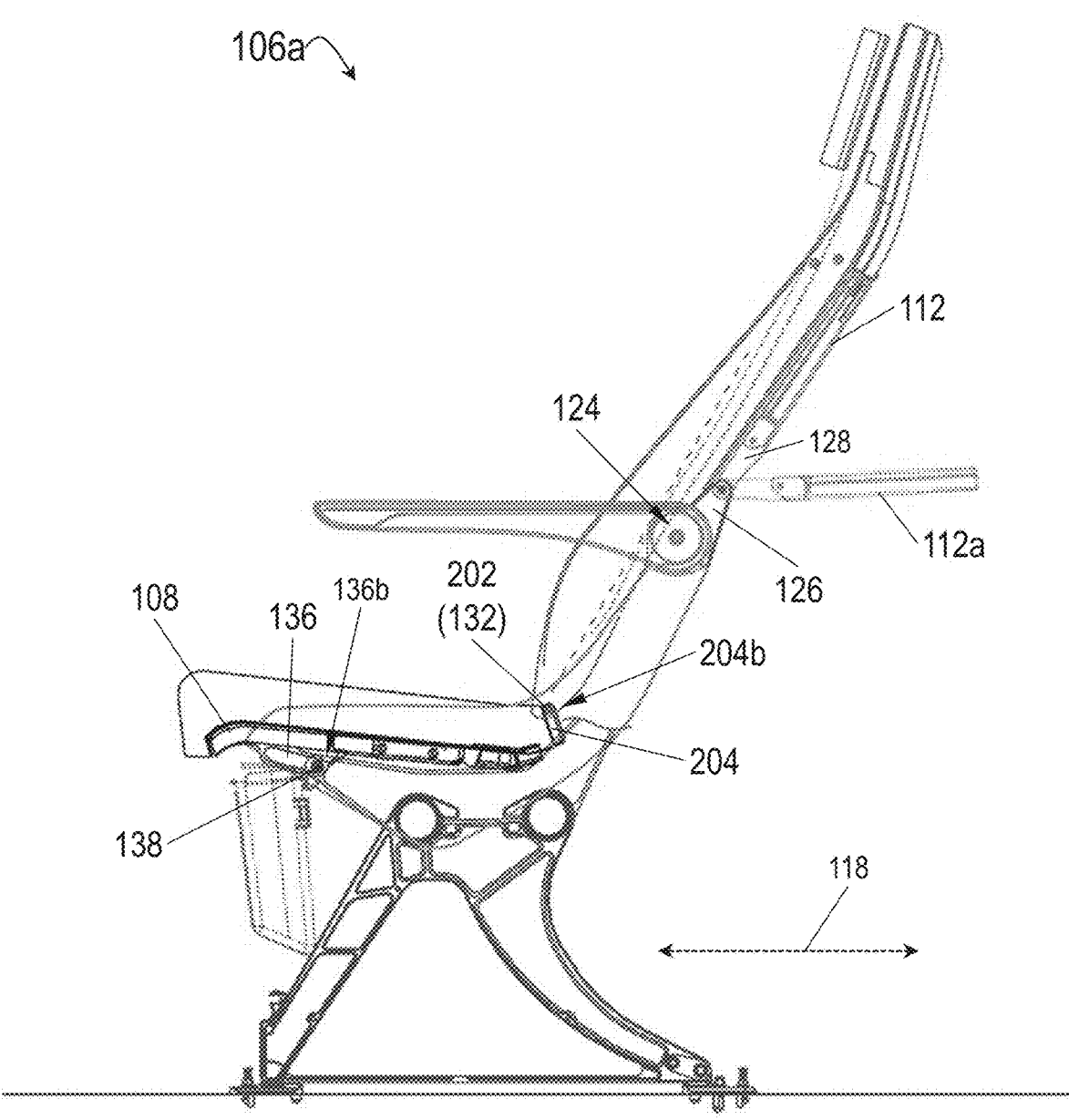
FIG. 2D is a left profile view of the passenger seat of FIG. 2C, wherein the passenger seats are in the reclined configuration.
Figure 2E:
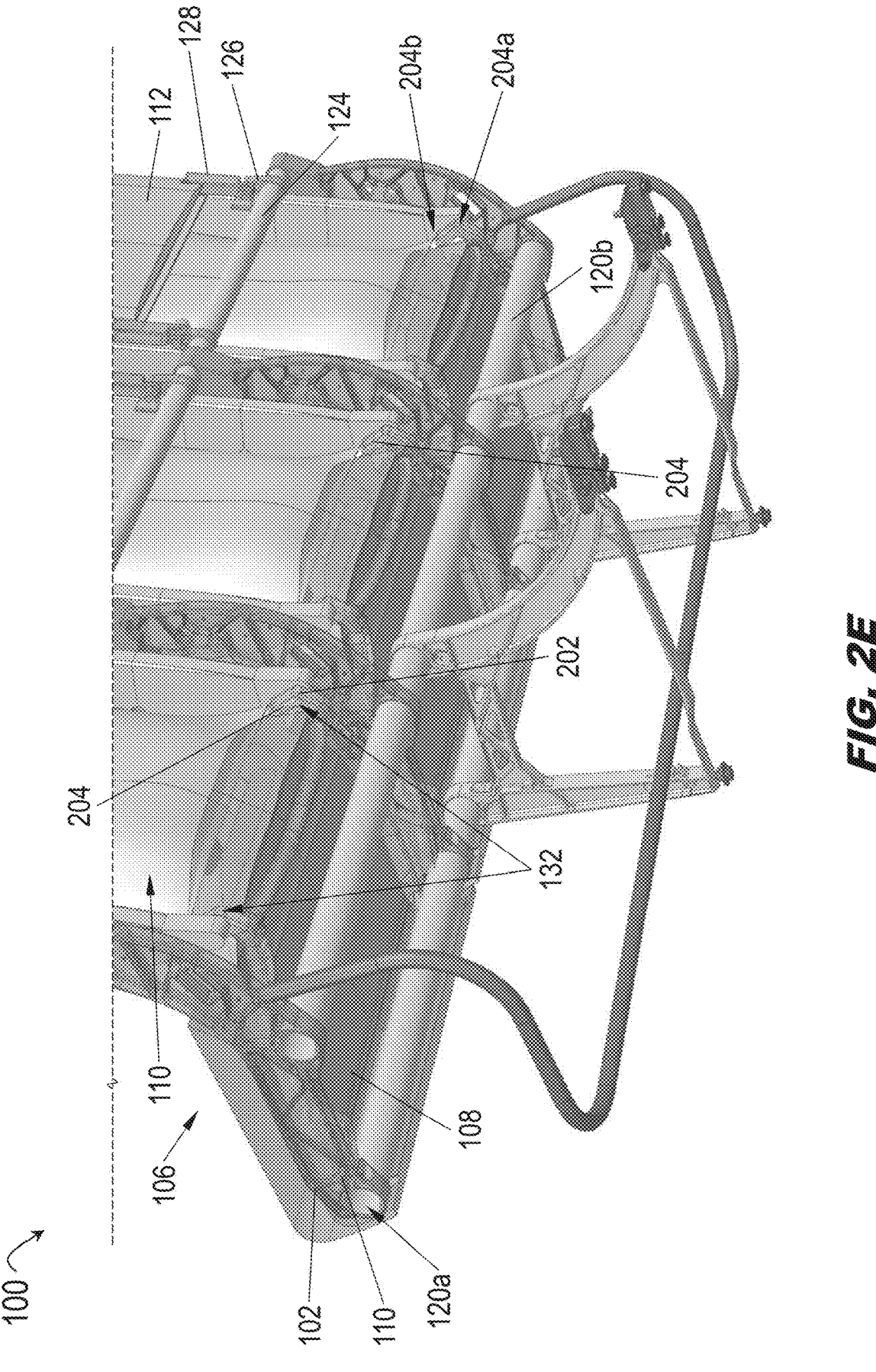
FIG. 2E is an underside view of the passenger seating assembly of FIG. 2A, wherein the passenger seats are in the TTOL configuration.

Referring now to FIGS. 2A through 2D, a passenger seat of the passenger seating assembly 100 is shown in the TTOL configuration 106 (e.g., by FIGS. 2A and 2C) and in the reclined configuration 106a (e.g., by FIGS. 2B and 2D, with a deployed meal table 112a in both cases). In embodiments, each passenger seat 106 may include (e.g., instead of or in addition to the forward slot 136 and forward cam followers 138 shown by FIG. 1C) a joint cam follower 202 fixed to the backrest 110 on its left and/or right sides near the lower terminal end, each joint cam follower corresponding to the common pivot point (132, FIGS. 1A-1F). Similarly, the seatpan 108 may include on its left and/or right sides a joint slot 204 set into the rear of the seatpan. Similarly to the forward slot/s 136 and forward cam follower/s 138, the joint slot 204 may be set into one or both sides of the seatpan 108.

In embodiments, as the passenger seat translates between the TTOL configuration 106 and the reclined configuration 106a, the joint cam followers 202 may translate along the rear joint slots 204 on either side of the passenger seat, between a lower terminus 204a of the rear joint slot (corresponding to the TTOL configuration 106) and an upper terminus 204b (corresponding to the reclined configuration 106a, wherein the backrest 110 has tilted forward and the seatpan 108 has tilted forward and upward).

Figure 3:
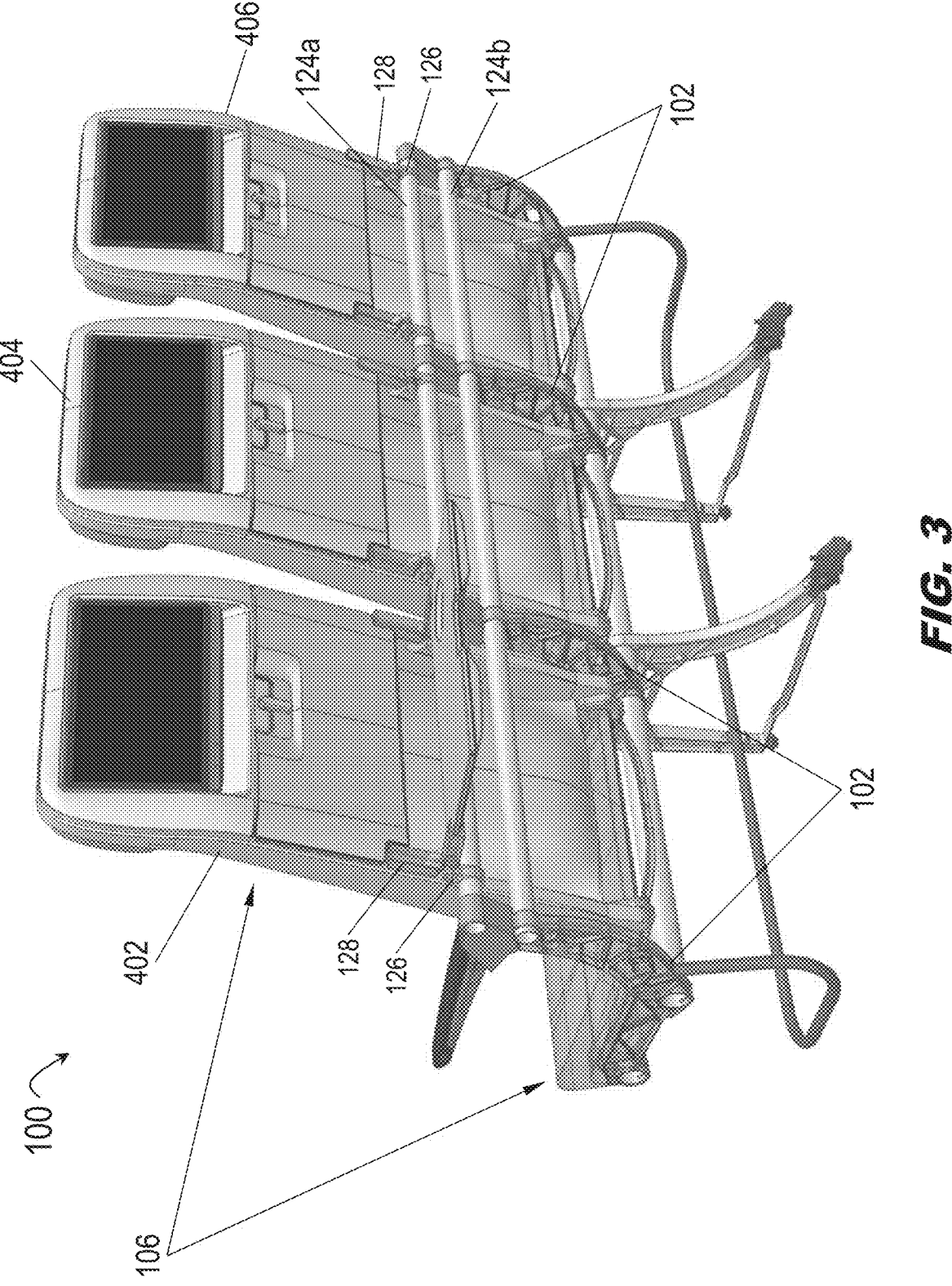
FIG. 3 is a rear isometric view of the passenger seating assemblies of FIGS. 1A and 2A wherein the passenger seats are in the TTOL configuration, incorporating an additional upper crossmember.

Referring now to FIG. 3, the passenger seating assembly 100 (e.g., as shown by FIGS. 1A through 1F, and also by FIGS. 2A through 2E) is shown with its passenger seats (e.g., window seat 402, middle seat 404, aisle seat 406) in the TTOL configuration 106.

In some embodiments, the passenger seating assembly 100 may include multiple upper crossmembers 124a, 124b. For example, similarly to the upper crossmember 124 shown by FIGS. 1A through 2D, the upper crossmembers 124a, 124b may both connect the seat of seat spreaders 102, e.g., at different heights.

In some embodiments, however, the brackets 126 to which the table extenders 128 are attached may be mounted to the upper crossmember 124a, while the lower crossmember 124b may add stability by connecting the seat spreaders 102 at an additional point.

Figure 4:
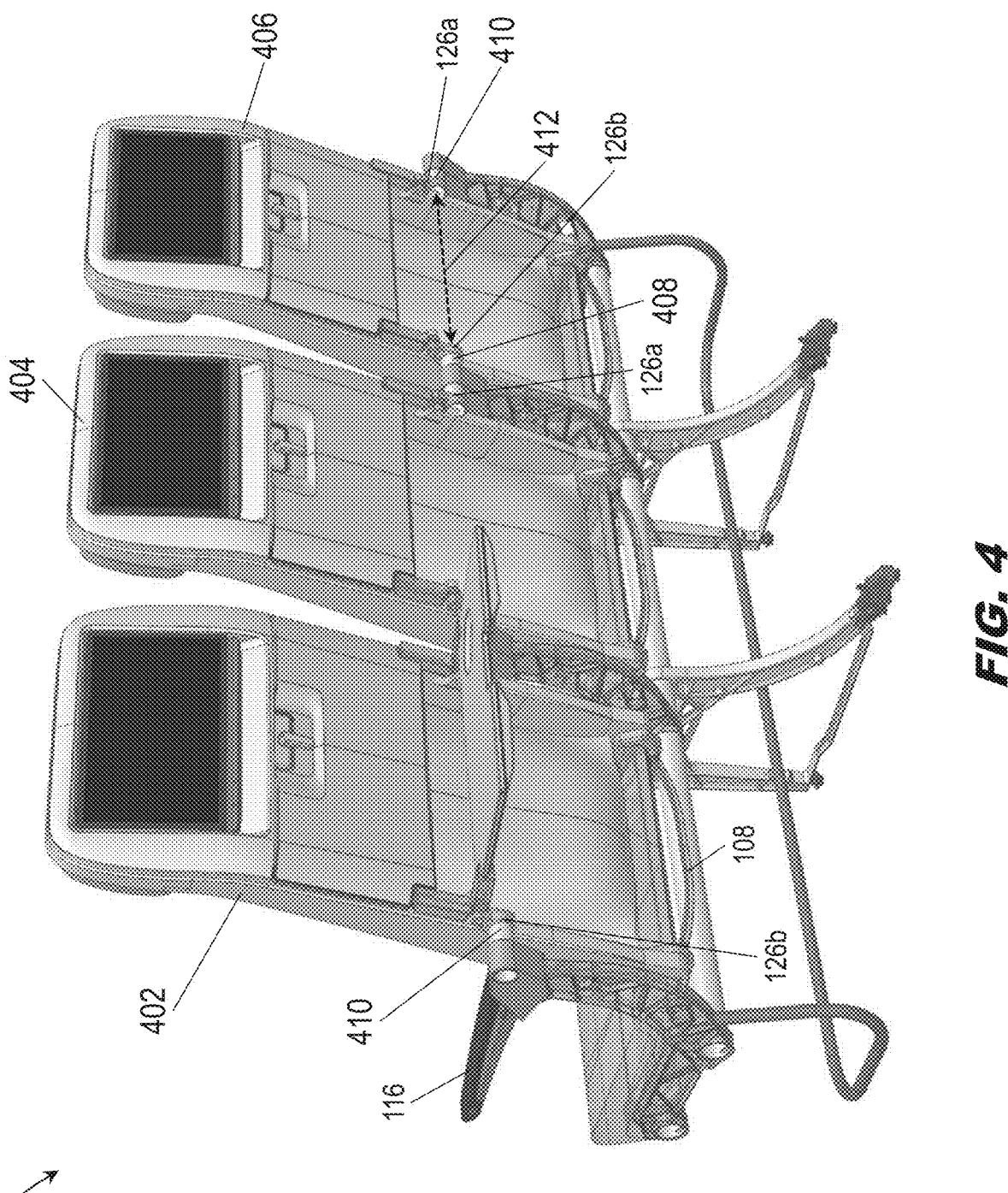
FIG. 4. is a rear isometric view of the passenger seating assemblies of FIGS. 1A and 2A wherein the passenger seats are in the TTOL configuration, incorporating a segmented upper crossmember.

Referring now to FIG. 4, the passenger seating assembly 100 (e.g., as shown by FIGS. 1A through 1F, and also by FIGS. 2A through 2E) is shown with its passenger seats (e.g., window seat 402, middle seat 404, aisle seat 406) in the TTOL configuration 106.

In some embodiments, the upper crossmember (124, FIGS. 1A-2D) may be implemented as a segmented crossmember comprising a series of upper crossmember segments 408, 410. For example, in place of the single upper crossmember 124, each upper crossmember segment 408 may connect two adjacent passenger seats 402-404, 404-406, such that a right-side bracket 126a associated with the middle seat 404 and a left-side bracket 126b associated with the aisle seat 406 are connected by the upper crossmember segment 408. Similarly, each upper crossmember segment 410 may be disposed on a left or right side of the passenger seating assembly 100 (e.g., on a window side of a window seat 402 or an aisle side of an aisle seat 406), such that only the left-side bracket 126b (e.g., and a left-side armrest 116) of the window seat 402 may be connected to a left-side upper crossmember segment 410, and only the right-side bracket 126a of the aisle seat 406 (and a right-side armrest, not shown) may be connected to a right-side upper crossmember segment 410.

In embodiments, the upper crossmember segments 408, 410 may be of minimal length, or of any appropriate length such that the left-side and right-side brackets 126b, 126a may be attached to their respective upper crossmember segments at any desired distance 412 apart from each other.

Figure 5A:
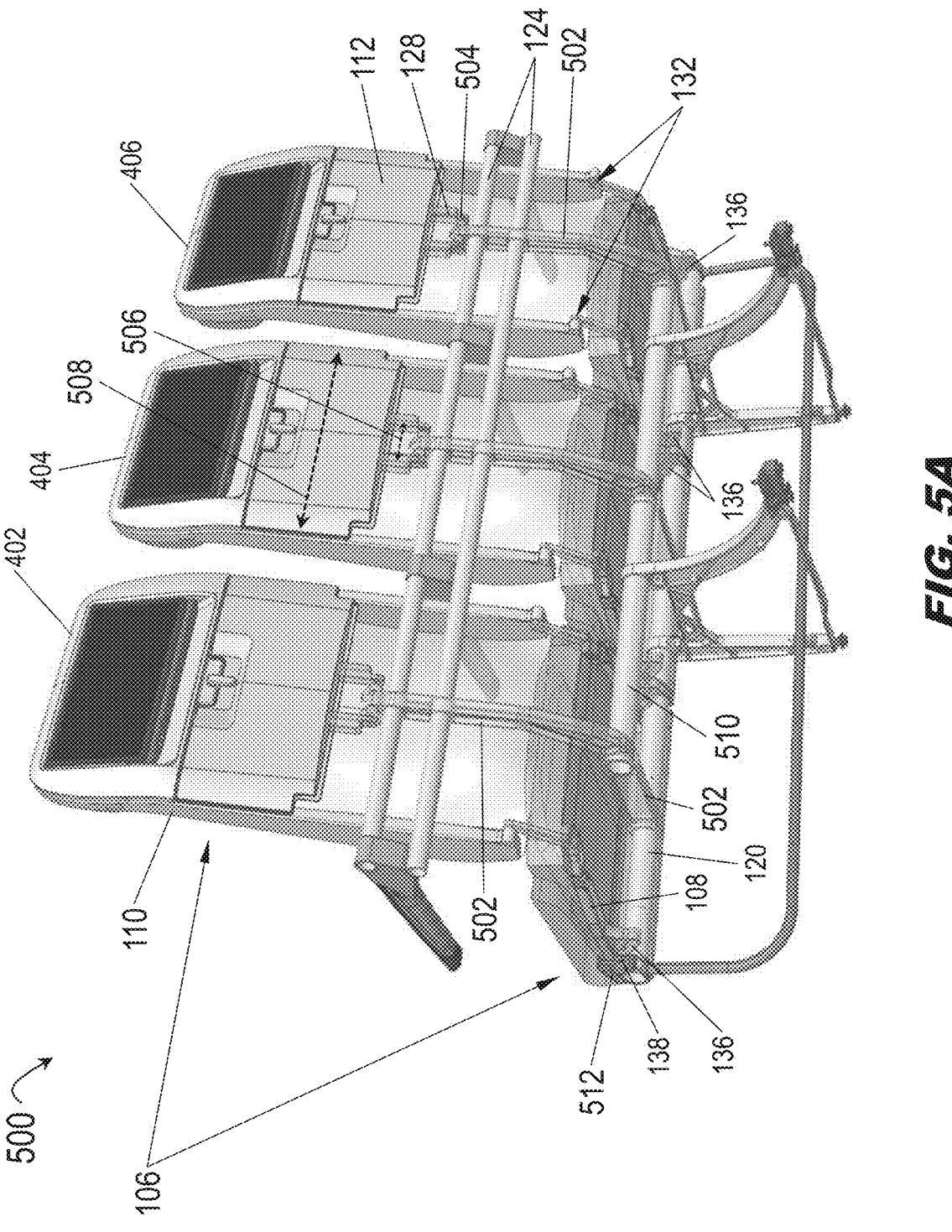
FIG. 5A is a rear isometric view of a passenger seating assembly according to example embodiments of the disclosure, wherein the passenger seats are in the TTOL configuration and incorporate central spinal supports.
Figure 5B:
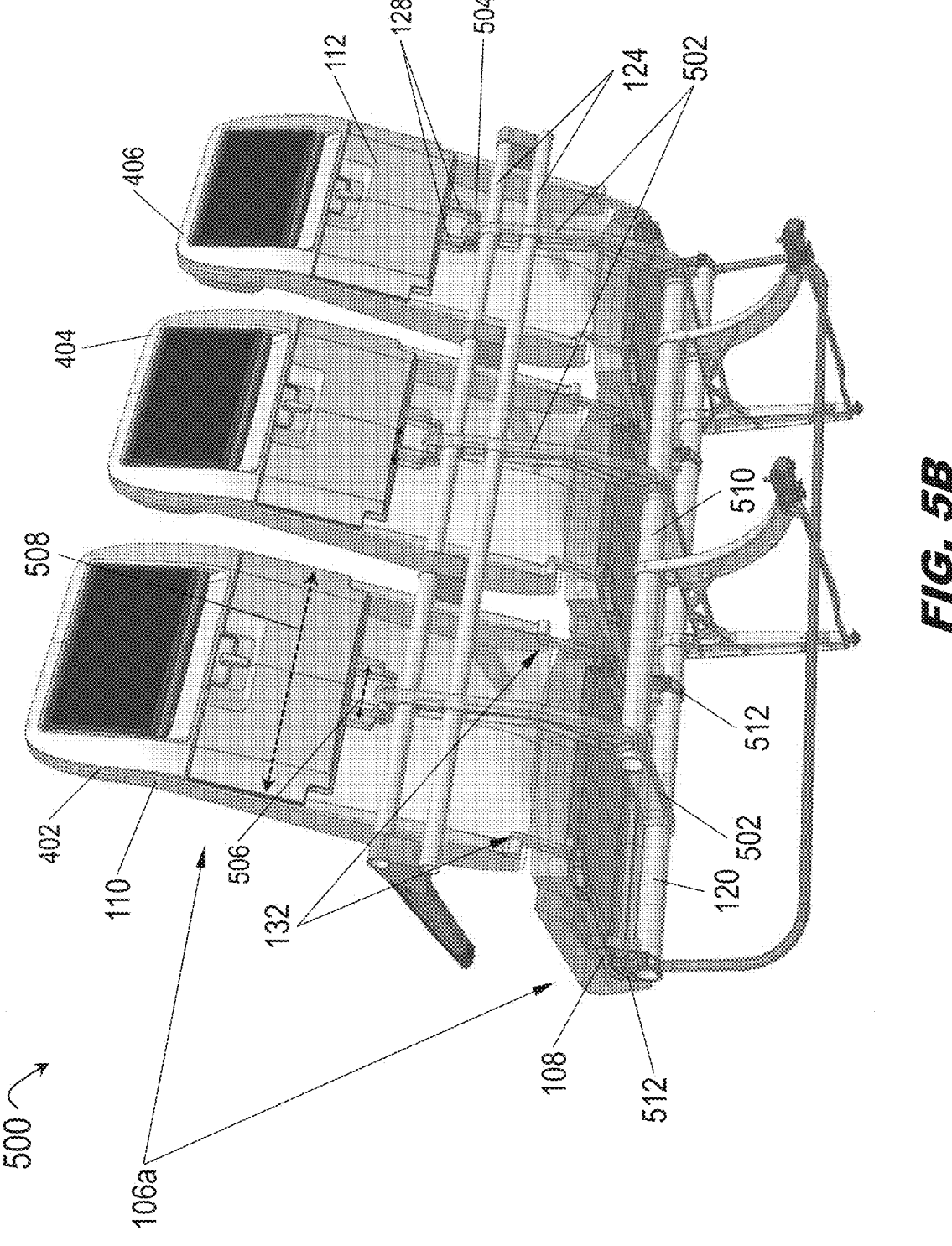
FIG. 5B is a rear isometric view of the passenger seating assembly of FIG. 5A, wherein the passenger seats are in the reclined configuration.
Figure 5C:
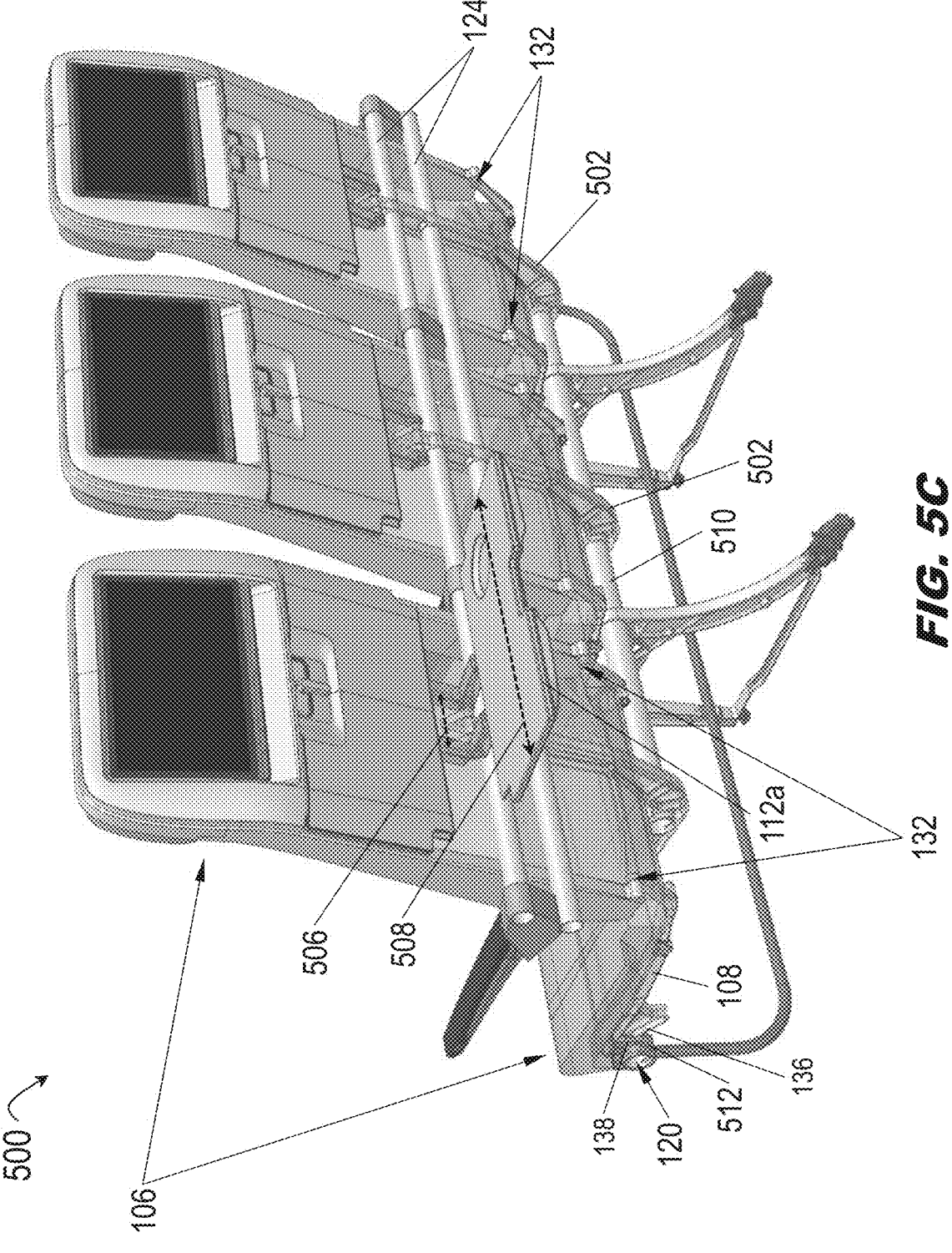
FIG. 5C is a rear overhead view of the passenger seating assembly of FIG. 5A, wherein the passenger seats are in the TTOL configuration.
Figure 5D:
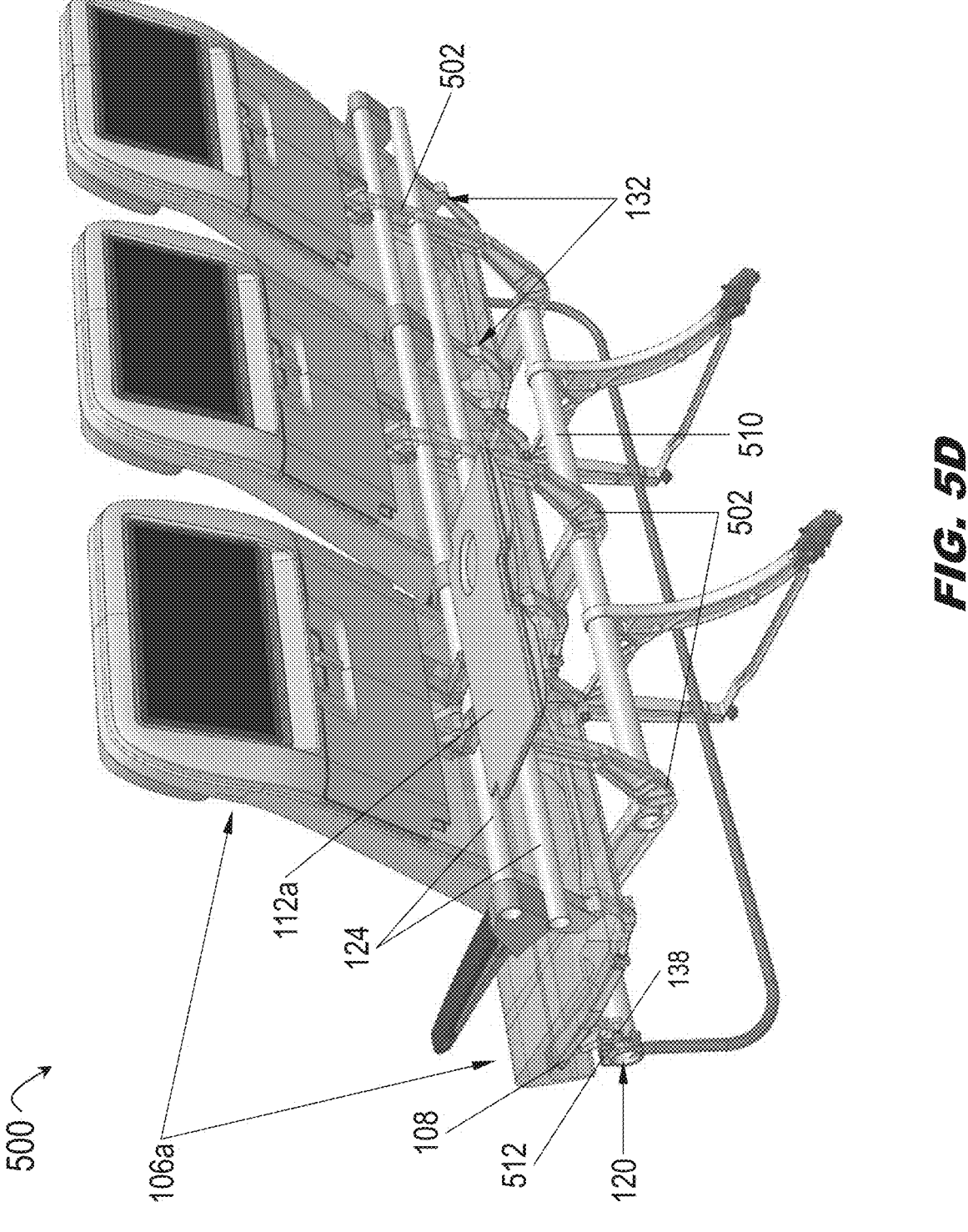
FIG. 5D is a rear overhead view of the passenger seating assembly of FIG. 5C, wherein the passenger seats are in the reclined configuration.
Figure 5E:
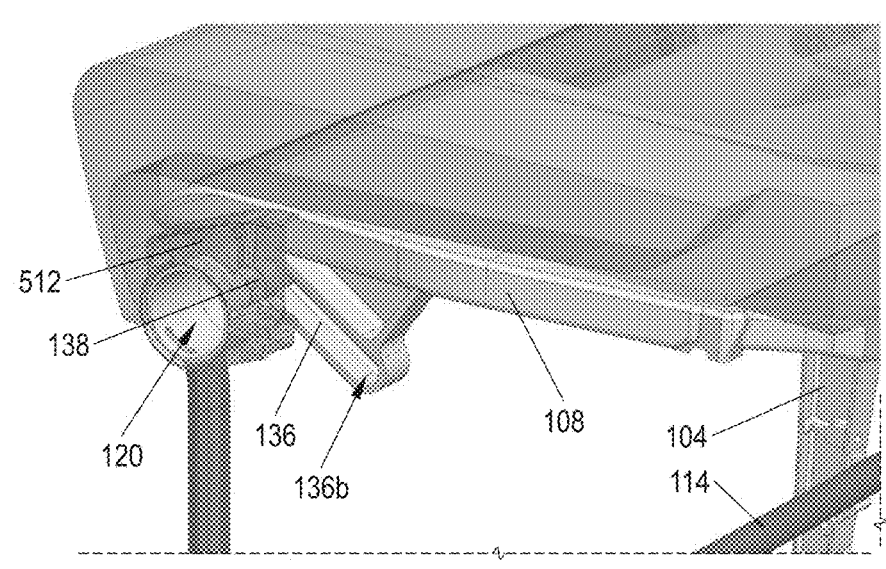
FIG. 5E is a detailed view of the passenger seating assembly of FIG. 5A, wherein the passenger seats are in the TTOL configuration.
Figure 5F:
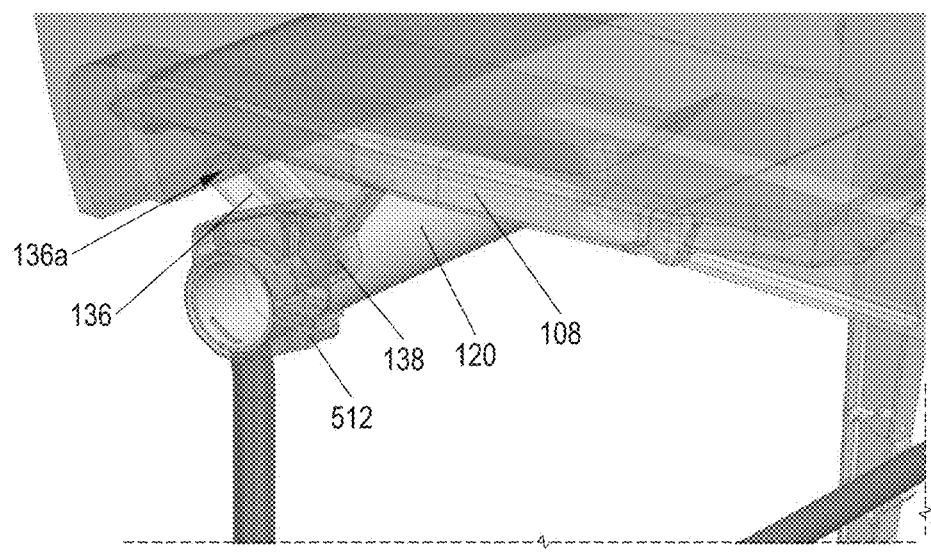
FIG. 5F is a detailed view of the passenger seating assembly of FIG. 5E, wherein the passenger seats are in the reclined configuration.

Referring now to FIGS. 5A through 5F, a passenger seat of the passenger seating assembly 500 is shown respectively in the TTOL configuration 106 (FIGS. 5A, 5C, 5E) and the reclined configuration 106a (FIGS. 5B, 5D, 5F).

In embodiments, the passenger seating assembly 500 may be implemented and may function similarly to the passenger seating assembly 100 of FIGS. 1A through 4, except that the passenger seating assembly 500 may include a spinal support 502 centrally oriented with respect to each passenger seat (e.g., window seat 402, middle seat 404, aisle seat 406). For example, each spinal support 502 may connect to the lower crossmember 120 and the upper crossmember/s 124 and include a pivot pin 504 pivotably connected at its upper end, such that the meal table 112 translates between the stowed configuration and the deployed configuration 112a by pivoting or rotating relative to an axis defined by the pivot pin.

In embodiments, the table extenders 128 may be mounted to the pivot pin 504 and may pivot relative to the pin when the meal table 112 transitions between the stowed configuration 112 shown by FIGS. 5A and 5B and the deployed configuration 112a showed by FIGS. 5C and 5D. For example, based on the length of the pivot pin 504, the table extenders 128 may be spaced at a variety of widths wherein the width 506 between the table extenders is less than the width 508 of the meal table 112.

In embodiments, the passenger seating assembly 500 may include an auxiliary lower crossmember 512 extending laterally across the seating assembly, e.g., parallel to the lower crossmember 120 (e.g., instead of the rear lower crossmember (120b, FIGS. 1B and 2A)). For example, the spinal support 502 may extend substantially horizontally and in the longitudinal direction 118 beneath the seatpan 108 of its respective passenger seat 402, 404, 406, and then extend substantially vertically behind the auxiliary lower crossmember 510 toward the upper crossmember/s 124 behind the passenger seat, in both cases not contacting the passenger seat.

Referring in particular to FIGS. 5E and 5F, a passenger seat (e.g., the window seat 402) of the passenger seating assembly 500 is shown in the TTOL configuration 106 (FIG. 5E) and reclined configuration 106a (FIG. 5F).

In embodiments, the passenger seating assembly 500 may include truncated seat spreaders 512. For example, the truncated seat spreaders 512 may be disposed similarly to the seat spreaders (102, FIGS. 1A and 2A), such that each passenger seat (window seat 402, middle seat 404, aisle seat 406; FIG. 5A) may be disposed between two adjacent truncated seat spreaders. In embodiments, however, the truncated seat spreaders 512 may truncate or terminate directly behind the lower crossmember 120 and forward cam follower 138 fixed into one or both of the truncated seat spreaders 512 adjacent to the seatpan 108 on either side. For example, the truncated seat spreaders 512 may allow the forward cam follower 138 to translate between the forward terminus 136a and the rear terminus 136b of the forward slot 136 as the seatpan 108 (to which the forward slot is fixed) is articulated relative to the truncated seat spreaders and to the forward cam follower, as the passenger seat is transitioned between the TTOL configuration 106 of FIG. 5E and the reclined configuration 106a of FIG. 5F.

CONCLUSION

Embodiments of the inventive concepts disclosed herein may provide for reclining of passenger seats without disturbing the horizontal orientation of meal tables in use by passengers immediately behind the reclining seats. Further, the anchoring of the meal tables to the fixed upper crossmember rather than to the backrest allows a broader variation in proportion and shape with respect to the meal tables themselves. For example, the attachment points of the meal table need not correspond to opposing ends of the backrest, e.g., the meal tables may be attached more closely to each other to allow for meal tables that not only pivot downward but unfold to deploy. Further, the potential for new meal table shapes and attachment points may add downstream variety to IFE systems and other rear-mounted components of the passenger seat or backrest that may no longer be constrained by the full-width rectilinear meal table.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A passenger seating assembly for an aircraft cabin, comprising:

a set of two or more seat spreaders disposed in a spaced apart relationship;

at least two legs disposed in a spaced apart relationship and configured for mounting to an aircraft cabin floor;

at least one lower crossmember connecting the set of seat spreaders and the at least two legs, the at least one lower crossmember extending in a lateral direction;

a plurality of passenger seats, each passenger seat disposed between two adjacent seat spreaders of the set of seat spreaders, each passenger seat including a seatpan pivotably connected to a backrest at a common pivot point, each passenger seat configured to transition between a default configuration and a reclined configuration by articulating the seatpan and the backrest in at least a longitudinal direction orthogonal to the lateral direction;

at least one upper crossmember disposed behind the plurality of passenger seats and connecting the seat spreaders, the at least one upper crossmember extending in the lateral direction; and wherein each passenger seat includes a meal table, each meal table pivotably coupled to the at least one upper crossmember and releasably coupled to the backrest of the corresponding passenger seat, each meal table configured to pivotably transition between a stowed configuration wherein the meal table is incorporated into the backrest and a deployed configuration wherein the meal table is substantially coplanar with the aircraft cabin floor independently of the transition of the corresponding passenger seat between the default and reclined configurations.

2. The passenger seating assembly of claim 1, wherein:

the at least one lower crossmember includes a forward lower crossmember and a rear lower crossmember disposed behind the forward lower crossmember;

wherein each seat spreader includes at least one forward cam follower fixed to the seat spreader proximate to the forward lower crossmember;

wherein each seatpan includes at least one forward slot set into a left or right side of the seatpan, each forward slot configured to accommodate the corresponding forward cam follower; and wherein each forward cam follower is configured to translate along the corresponding forward slot while the passenger seat transitions between the default and reclined configurations.

3. The passenger seating assembly of claim 1, wherein:

the backrest includes at least one joint cam follower fixed to a left or right side of the backrest at the common pivot point;

wherein the seatpan includes at least one joint slot on a left or right side of the seatpan; and wherein each joint cam follower is configured to translate along the respective joint slot on the left or right side of the seatpan while the passenger seat transitions between the default and reclined configurations.

4. The passenger seating assembly of claim 1, wherein:

each meal table is pivotably coupled to the at least one upper crossmember via two or more table extenders, each table extender pivotably coupled to the meal table at a first end and pivotably coupled to the at least one upper crossmember at a second end opposite the first end.

5. The passenger seating assembly of claim 4, wherein:

each table extender is pivotably coupled at the second end to a bracket fixed to the at least one upper crossmember.

6. The passenger seating assembly of claim 4, wherein the upper crossmember comprises a plurality of disconnected crossmember segments, and wherein the two or more table extenders include:

a left-side table extender pivotably coupled to a left-side crossmember segment; and a right-side table extender pivotably coupled to a right-side crossmember segment disconnected from the left-side crossmember segment.

7. The passenger seating assembly of claim 6, wherein a first table extender associated with a first passenger seat and a second table extender associated with a second passenger seat adjacent to the first passenger seat are pivotably coupled to a shared crossmember segment.

8. The passenger seating assembly of claim 4, wherein:

each table extender includes at least one slot extending between the first and second ends, wherein the at least one slot is configured to accommodate an edge of the meal table; and wherein the meal table is configured to translate in the longitudinal direction via translation of the at least one tab along the at least one slot.

9. A passenger seat for an aircraft cabin, comprising:

two seat spreaders disposed in a spaced apart relationship;

two legs disposed in a spaced apart relationship and configured for mounting to an aircraft cabin floor;

at least one lower crossmember connecting the seat spreaders and the legs, the at least one lower crossmember extending in a lateral direction;

a seatpan pivotably connected to a backrest at a common pivot point, the seatpan and the backrest disposed between the two seat spreaders and collectively configured to support a passenger, wherein the passenger seat is configured to transition between a default configuration and a reclined configuration by articulating the seatpan and the backrest in at least a longitudinal direction orthogonal to the lateral direction;

an upper crossmember disposed behind the backrest and connecting the seat spreaders, the upper crossmember extending in the lateral direction; and a meal table pivotably coupled to the at least one upper crossmember and releasably coupled to the backrest, the meal table configured to pivotably transition between a stowed configuration wherein the meal table is incorporated into the backrest and a deployed configuration wherein the meal table is substantially coplanar with the aircraft cabin floor independently of the transition of the passenger seat between the default and reclined configurations.

10. The passenger seat of claim 9, wherein:

the at least one lower crossmember includes a forward lower crossmember and a rear lower crossmember disposed behind the forward lower crossmember;

wherein each seat spreader includes at least one forward cam follower fixed to a left or right side of the seat spreader proximate to the forward lower crossmember;

wherein the seatpan includes at least one forward slot set into a left or right side of the seatpan, each forward slot configured to accommodate the corresponding forward cam follower; and wherein each forward cam follower is configured to translate along the corresponding forward slot while the passenger seat transitions between the default and reclined configurations.

11. The passenger seat of claim 9, wherein:

the backrest includes at least one joint cam follower fixed to a left or right side of the backrest on its left or right side;

wherein the seatpan includes at least one joint slot on a left or right side of the seatpan; and wherein each joint cam follower is configured to translate along the respective joint slot on the left or right side of the seatpan while the passenger seat transitions between the default and reclined configurations.

12. The passenger seat of claim 9, wherein:

the meal table is pivotably coupled to the upper crossmember via two or more table extenders, each table extender pivotably coupled to the meal table at a first end and pivotably coupled to the upper crossmember at a second end opposite the first end.

13. The passenger seat of claim 12, wherein:

each table extender is pivotably coupled at the second end to a bracket fixed to the upper crossmember.

14. The passenger seat of claim 12, wherein the upper crossmember comprises a plurality of disconnected crossmember segments, and wherein the two or more table extenders include:

a left-side table extender pivotably coupled to a left-side crossmember segment; and a right-side table extender pivotably coupled to a right-side crossmember segment disconnected from the left-side crossmember segment.

15. The passenger seat of claim 12, wherein:

each table extender includes at least one slot extending between the first and second ends, wherein the at least one slot is configured to accommodate an edge of the meal table; and wherein the meal table is configured to translate in the longitudinal direction via translation of the at least one tab along the at least one slot.

16. A passenger seating assembly for an aircraft cabin, comprising:

a plurality of seat spreaders disposed in a spaced apart relationship;

at least two legs disposed in a spaced apart relationship and configured for mounting to a floor of the aircraft cabin;

at least one lower crossmember connecting the plurality of seat spreaders and the at least two legs, the at least one lower crossmember extending in a lateral direction;

a plurality of passenger seats, each passenger seat disposed between two adjacent seat spreaders of the plurality of seat spreaders, each passenger seat comprising a backrest and a seatpan pivotably connected at a common pivot point, each passenger seat configured to transition between a default configuration and a reclined configuration by articulating the seatpan and the backrest in at least a longitudinal direction orthogonal to the lateral direction;

at least one upper crossmember disposed behind the plurality of passenger seats and extending in the lateral direction;

a plurality of spinal supports connected at a lower end by the at least one lower crossmember, each spinal support centrally oriented relative to an associated passenger seat of the plurality of passenger seats, each spinal support extending beneath the seatpan and behind the backrest of the associated passenger seat;

wherein each passenger seat includes a meal table, each meal table pivotably coupled to the spinal support of the associated passenger seat and releasably coupled to the backrest of the associated passenger seat, each meal table configured to pivotably transition between a stowed configuration and a deployed configuration wherein the meal table is substantially coplanar with the floor independently of the transition of the passenger seat between the default and reclined configurations.

17. The passenger seating assembly of claim 16, wherein each seat spreader includes at least one forward cam follower fixed to a left or right side of the seat spreader proximate to the lower crossmember;

wherein each seatpan includes at least one forward slot set into a left or right side of the seatpan, each forward slot configured to accommodate the corresponding forward cam follower; and wherein each forward cam follower is configured to translate along the corresponding forward slot while the passenger seat transitions between the default and reclined configurations.

18. The passenger seating assembly of claim 16, wherein each meal table is pivotably coupled to the spinal support of the associated passenger seat by a pivot pin set into an upper end of the spinal support, the upper end opposite the lower end.

19. The passenger seating assembly of claim 18, wherein each meal table is coupled to the pivot pin by a pair of table extenders attached to opposing ends of the pivot pin, the pair of table extenders separated by a first width, the first width less than a second width of the meal table.

20. The passenger seating assembly of claim 16, wherein each seat spreader of the plurality of seat spreaders is a truncated seat spreader terminating behind and proximate to the lower crossmember.

* * * * *